INVENTOR
Edward Herbert Theobald Jackson
By Strauch & Hoffman
Attorneys

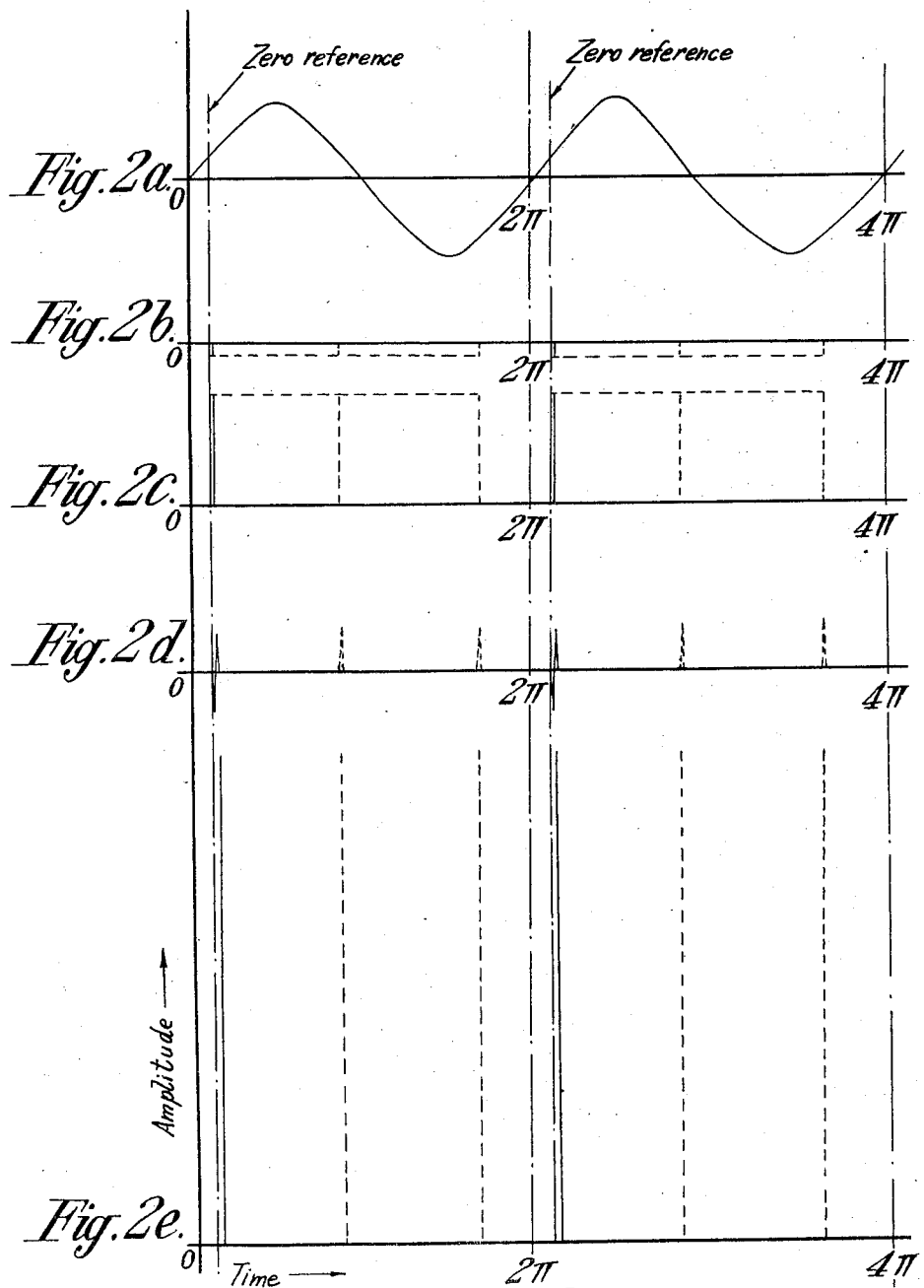

Patented June 30, 1953

2,644,137

UNITED STATES PATENT OFFICE 2,644,137

CATHODE-RAY TUBE VOLTMETER

Edward Herbert Theobald Jackson, Redhill, England

Application June 27, 1949, Serial No. 101,628
In Great Britain July 1, 1948

2 Claims. (Cl. 324—120)

This invention relates to apparatus for the indication of potential differences and by calibration for the measurement of voltage.

In the specification of my copending United States patent application No. 1,798, filed on January 12, 1948, now Patent No. 2,550,816, is described apparatus for the measurement of an electrical quantity comprising a multivibrator, a pulse generator, a pulse shifter, a shaping circuit, connections for a source of alternating current of fundamental frequency, connections for a source of direct current, connections for a cathode ray tube or tubes and connections for an input device.

The main object of the present invention is to provide a more simple arrangement of the above character while not detracting from or seriously detracting from the merits of the apparatus of my aforesaid copending application.

To that end I have found that the multivibrator referred to above and the pentode valve and associated components of the input circuit may be omitted from the circuit of the aforesaid application and replaced by a different valve and associated components as referred to in more detail below. In addition I find it advantageous to take the synchronising signal from the anode of a valve referred to below and apply it to the first time-base of a display unit and to synchronise a second time-base from the first time-base, a third from the second and so on.

I have also found that far from detracting from the merit of the apparatus according to my aforesaid copending application by these modifications I can improve the sensitivity of the apparatus and also its stability, that is to say, the relative fixing or non-wandering of the pulse in any given position set by the signal or electro-motive force requiring to be measured or indicated.

I have also found means for improving the indexing on the cathode ray tube screens, as referred to in more detail below.

The invention consists in apparatus in accordance with any one or more of the following numbered clauses, that is to say:

*Clause 1.*—Apparatus for the indication of potential differences and by calibration for the measurement of voltage comprising a pulse generator, a pulse shifter, a shaping circuit, connections for a source of alternating current of fundamental frequency, connections for a source of direct current and connections for an input device, with direct, that is to say, valveless connections to a source of electro-motive force or potential desired to be measured or indicated but with or without the intermission of a variable resistor;

*Clause 2.*—Apparatus for the indication of potential differences and by calibration for the measurement of voltage substantially as hereinafter described with reference to the accompanying diagrammatic drawings;

*Clause 3.*—Apparatus in accordance with Clause 1 or Clause 2 in which a heptode valve substantially as herein described is used in the pulse generator circuit;

*Clause 4.*—Apparatus in accordance with any of Clauses 1, 2, 3 in which the fundamental frequency controlling the recurrence frequency of the pulse phase-shift unit may be fed from any cyclically varying voltage source and can conveniently be supplied from one of the L. T. windings of the power pack transformer through a suitable potential divider if necessary.

*Clause 5.*—Apparatus in accordance with any of Clauses 1 to 4 in which the control of the pulse phase-shift is done by applying the signal or E. M. F. to be indicated or measured or both to one or more of the grids of a multi-electrode valve of the first stage;

*Clause 6.*—Apparatus in accordance with any of Clauses 1 to 5, in which a synchronising signal is taken from the anode of the valve $V_3$ substantially as illustrated;

*Clause 7.*—Apparatus in accordance with any of Clauses 1 to 6 in which the time base generators except the first are synchronised from each other in sequence;

*Clause 8.*—Apparatus in accordance with any of Clauses 1 to 7 in which a valve indicated as $V_4$ controls a blocking oscillator type of output circuit;

*Clause 9.*—Apparatus in accordance with any of Clauses 1 to 8 in which applying the output pulse to more than one electrode of one or more of the indicating cathode ray tubes causes increased index definition, or by applying this pulse to control an independent source of E. M. F. applied in similar manner to the display cathode ray tubes gives increased index definition;

*Clause 10.*—Apparatus in accordance with any of Clauses 1 to 9 with the addition of a valve and associated components of a pulse controlled oscillator of the blocking oscillator type to improve the indexes on the cathode ray tubes screens;

*Clause 11.*—Apparatus in accordance with any of Clauses 1 to 10 in which instead of applying a pulse directly to the cathode of a ray tube display unit, it is caused, on account of pulse shape and index definition and brightness, to trigger an oscillator through a triggering or buffer valve, and the output of this oscillator is fed to the display unit.

Referring to the accompanying diagrammatic drawings:

Figure 2 is a composite figure, comprising a series of graphs or curves on a time base with amplitude ordinates marked for convenience Figures 2a, 2b, 2c, 2d and 2e, details of which are given below.

Figure 1:
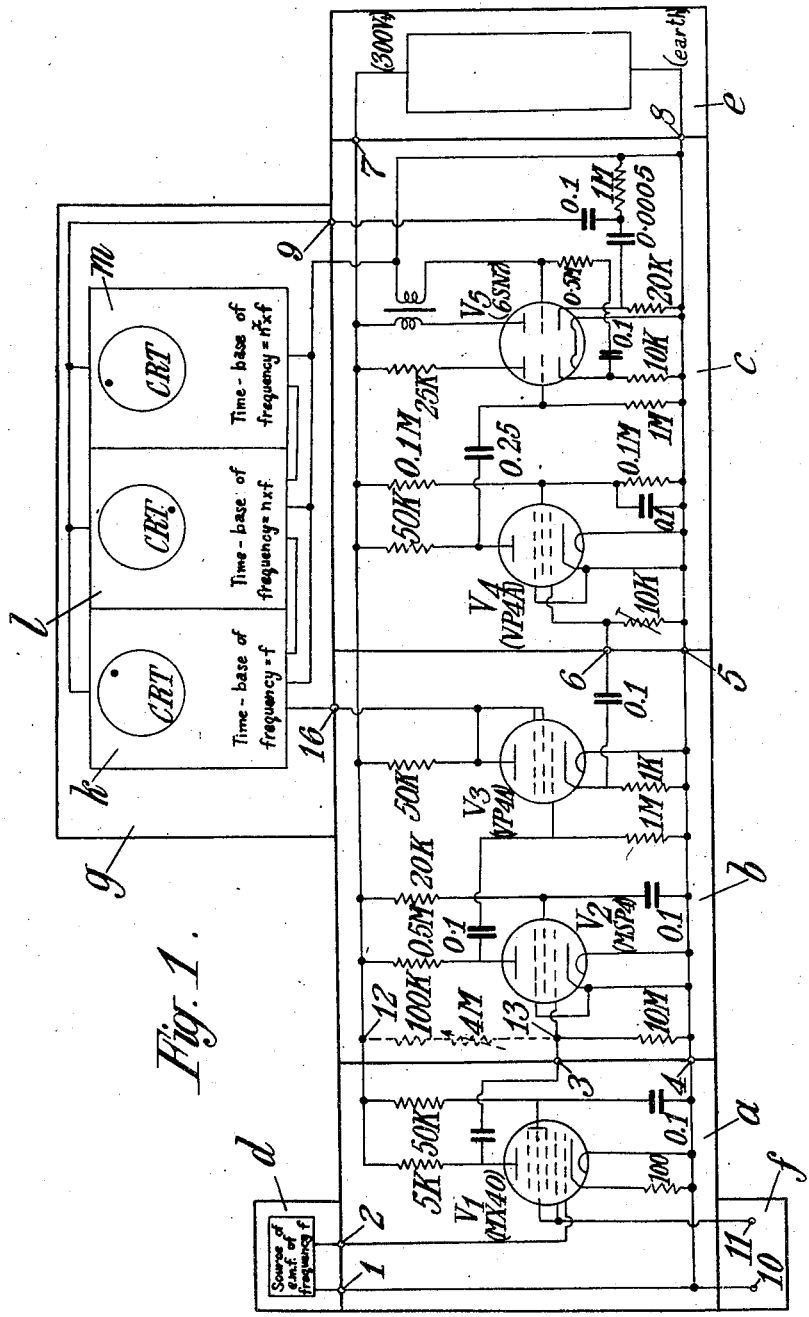
Figure 1 illustrates one form of apparatus according to the present invention.

In carrying the invention into effect in the form illustrated in Figure 1, the principal parts or groups constituting the apparatus are enclosed in thick-line boundaries in which:

$a$ is a generator of a pulse of variable duration;

$b$ is a pulse amplifier and coupling stage;

$c$ is a pulse shaping unit which in combination with $a$ given phase-shift or time-delay;

$d$ is a source of alternating current of desired frequency forming the fundamental frequency of the apparatus;

$e$ is a source of direct current and may be that known as a power pack, or other means for rectifying alternating current or for converting alternating current into direct current;

$f$ is an input circuit for the direct or alternating electrical quantity to be measured or indicated;

$g$ is an output circuit.

In circuit $a$ one pair of incoming terminals are marked 1 and 2 the other pair of incoming terminals are marked 10 and 11. The terminals common to circuits $a$ and $b$, that is the outgoing terminals from circuit $a$ and the incoming terminals to circuit $b$, are marked 3 and 4. The terminals common to circuits $b$ and $c$ are marked 5 and 6. The terminals common to circuits $c$ and $e$ are marked 7 and 8. The terminals common to circuits $c$ and $g$ are marked 8 and 9.

Although it is said that there are terminals common to two circuits they are not nor need not in fact be actual terminals but points of reference on continuous leads.

The circuits $a$, $b$ and $c$ include valves with associated electrical components such as resistors, capacitors and the like connected as illustrated. The values of these various electrical components depend upon the valves chosen and the values shown in the diagram are suitable for the valves designated. The values are not critical. The capacitor values are all in microfarads and the resistor values in ohms. The prefix $K=1,000$ and the prefix $M=10^6$.

The valve $V_1$ shown in block $a$ is known as a heptode though two of the grids as illustrated are connected inside the valve and two of the grids as illustrated are connected outside the valve. Such a valve, I find, has particular advantages in this circuit.

The valves $V_2$ and $V_3$ shown in block $b$ are pentode valves. The valve $V_4$ of block $c$ is a pentode valve; the valve $V_5$ of block $c$ is shown as a twin triode. A variable resistor may be used at the incoming side of block $b$ as indicated in dotted lines the terminals thereof being marked 12 and 13. In block $c$ one of the resistors is indicated as an adjustable resistor. The function of this is to alter the height of the pulse at the output of $V_4$. I find it is only necessary to have one adjustable resistor in the whole set and indeed even this if desired may be omitted.

The operation of the apparatus is as follows:

Block $d$, Figure 1, is a source of alternating voltage, say of the wave-form shown in Figure 2a. This controls the recurrence frequency and the zero reference of the rectangular pulse of variable duration generated by the heptode valve $V_1$, block $a$, the connections being at terminals 1 and 2. The pulse shape is shown by Figure 2b. Heptode valve $V_1$, block $a$, is used with three grid systems, one at a potential intermediate that of the cathode and anode supplied through the resistor (50 K) and at zero A. C. potential by means of the condenser (0.1) as shown in Figure 1. One system is at a low alternating potential obtained from the source of E. M. F. of frequency $f$ of block $d$, and one system has applied to it the potential required to be indicated. The grid system nearest the cathode has the low valued alternating voltage applied to it, and this voltage imparts rhythmic motion to the space charge around the cathode and will start electron flow to the anode at some point in its positive cycle, so that this grid imparts a cyclic rate to the output of the valve. The next grid system which has the signal potential to be indicated applied to it is the main control of electron flow and controls the duration between start and stop of this flow in relation to the cyclic variation of the first mentioned grid potential. The third grid system protects against secondary emission. The load resistor (5 K) in the anode circuit of valve $V_1$ is of such value as to keep the output wave shape substantially rectangular as illustrated. The duration of this rectangular pulse is governed by the magnitude of the signal or E. M. F. to be indicated or measured or both which is applied to the terminals 10 and 11 of block $f$. The full-line pulse shown in Figure 2b is for zero applied signal or E. M. F. to these terminals and the dashed-line pulses for other given values of the applied signal or E. M. F. The rectangular pulse is amplified by the valve stage $V_2$ of block $b$ and coupled to the differentiating amplifier stage $V_4$ of block $c$ by the valve stage $V_3$ in block $b$. The output wave-form of $V_2$ is shown in Figure 2c. While the cathode load resistor of $V_3$ supplies the signal to succeeding sections of the pulse generator the anode load resistor supplies the primary synchronizing and reference zero signal, of frequency equal to that at the terminals 1 and 2, to the time-base circuits of the cathode ray tube display unit. The output wave-form of the differentiating amplifier containing $V_4$, block $c$, is shown in Figure 2d, again as in full-line pulse for zero signal at terminals 10 and 11 and as dashed-line pulses for two other given values of this signal. The time between its occurrence and the reference zero of the system is directly dependent upon the magnitude of the signal or E. M. F. at the terminals 10 and 11 of block $f$. The differentiating amplifier produces at its output a short pulse at the terminus of each pulse generated at tube $V_1$, which short pulse as seen in Figure 2d is phase displaced from the zero reference position according to the signal magnitude. Attention is called to United States Letters Patent to Christaldi showing such a differentiating amplifier if further explanation be needed. This pulse is used to trigger the blocking oscillator $V_5$ and associated components of the second part of black $c$, the output wave-form at the terminals 8 and 9 being shown in Figure 2e.

Now referring to Figure 1; this pulse is used to trigger or deflect or both the electron beams of a series of cathode ray tubes, such as shown by the display unit of block $g$. If the time-base generator of unit $k$ in block $g$ be of the same frequency as the source $d$ and synchronised to it by the aforesaid signal from $V_3$ taken at terminals 8 and 16 the index on the cathode ray tube screen will take up a steady position the distance of which from the reference mark or zero will depend upon the time interval between the occurrence of the pulse from the output terminals 8 and 9 and this reference, the reference being a definite point of the wave-form of the source $d$ as shown by all sections of Figure 2.

Since this interval is controlled by the magnitude of the signal or E. M. F. to be indicated or measured, the distance between a reference point or mark on the cathode ray tube screen and the index given by the beam's position will be a measure of this signal or E. M. F. If this same pulse be applied to a second and similar cathode ray tube and time-base generator unit, as at $l$ of block $g$, but where the time-base frequency, though synchronised to the first time-base generator of $k$ is $n$ times that of $k$, $n$ being a whole number, then the index caused by the pulsed electron beam will be displaced $n$ times the distance from the reference zero as that simultaneously displayed by the unit $k$, and the sensitivity of $l$ to a change of magnitude of the applied signal or E. M. F. at the terminals 10 and 11 will be $n$ times greater. In this way a decade type of indicating dial-train may be assembled where $n$ is made equal to ten in each successive time-base generator such as is contained in the units $k$, $l$ and $m$ making up the display unit of block $g$.

By suitable choice of the values of the components of Figure 1 the distance of the index from the zero mark or reference can be made proportional to the magnitude of the signal or E. M. F. applied to the input terminals 10 and 11 and by placing a suitably divided scale adjacent to the loci of the indexes of the display unit and calibrating the device as a whole against a standardised source of voltage or primary voltage standard the instrument is not only an indicating device but an instrument for the measurement of an electrical quantity.

GENERAL

Among the improvements due to the above, arrangements of the pulse phase-shift or pulse time-delay unit are:

1. The fundamental frequency controlling the recurrence frequency of the pulse phase-shift unit may be fed from any cyclically varying voltage source and can conveniently be supplied from one of the L. T. windings of the power pack transformer through a suitable potential divider if necessary; thus the need for the multivibrator unit of United States application No. 1,798 is obviated;

2. The control of the pulse phase-shift is done by applying the signal or E. M. F. to be indicated or measured or both to one or more of the grids of the multi-electrode valve of the first stage. This greatly increases the sensitivity of the unit. It enables one of the input terminals to be at earth potential and the valve $V_3$ of the original circuit to be discarded. It has also improved the stability of the device as a whole. The variable and fixed resistors in series, shown dotted in Figure 1, may be included and used as a zeroing or positioning control of the pulse with respect to the zero time reference;

3. The synchronising signal taken from the anode of $V_3$ as shown in Figure 1 increases stability;

4. By synchronising the time-base generators except the first from each other in sequence increases stability;

5. By letting $V_4$ control the blocking oscillator type of output circuit gives increased index definition;

6. By applying the output pulse to more than one electrode of one or more of the indicating cathode ray tubes causes increased index definition; or by applying this pulse to control an independent source of E. M. F. applied in similar manner to the display cathode ray tubes gives increased index definition;

7. The addition of a valve and associated components of a pulse controlled oscillator of the blocking oscillator type has improved the indexes on the cathode ray tubes screens;

8. Instead of applying a pulse directly to the cathode of a ray tube display unit, it has been found better, on account of pulse shape and index definition and brightness, to trigger an oscillator through a triggering or buffer valve, and the output of this oscillator is fed to the display unit. With certain types of time-base arrangements, for example, the linear sweep type, it has been found advantageous to apply this output to more than one electrode of one or more of the cathode ray tubes forming the display unit resulting in further improvement of index; or alternatively this pulse may be used to trigger an independent source of E. M. F. applied to the display system for index purposes.

I claim:

1. A voltage measuring device comprising means for producing a series of rectangular electrical impulses at a predetermined frequency and of a duration proportional to an applied electrical potential to be measured, said means comprising an electronic valve having an anode, a cathode, and at least two grids interposed between said anode and cathode, means for applying an alternating current signal of known frequency to one of said grids to produce a series of rectangular impulses at the output of said valve of a frequency equal to that of said alternating current signal, and means for connecting the other of said grids to the source of voltage to be measured to control the duration of the rectangular impulses produced in accordance with the applied voltage; and means connected to said impulse producing means for differentiating the rectangular impulses produced thereby to form for each rectangular impulse a pair of short duration impulses spaced in timed relation in accordance with the duration of the applied rectangular impulse, and means responsive to said short duration impulses providing an indication of the voltage to be measured.

2. A voltage measuring device as defined in claim 1 wherein said last named means includes a cathode ray tube indicating device, means responsive to the first short duration impulse corresponding to each rectangular impulse for synchronizing said display device, and means responsive to the second short duration impulse for each such rectangular impulse for causing said cathode ray tube display device to produce an indication of the applied electrical potential to be measured.

EDWARD HERBERT THEOBALD
JACKSON.

References Cited in the file of this patent

UNITED STATES PATENTS

| Number | Name | Date |
| --- | --- | --- |
| 2,178,074 | Jakel et al. | Oct. 31, 1939 |
| 2,293,135 | Hallmark | Aug. 18, 1942 |
| 2,315,377 | Poch | Mar. 30, 1943 |
| 2,355,363 | Christaldi | Aug. 8, 1944 |
| 2,403,626 | Wolff et al. | July 9, 1946 |
| 2,422,386 | Anderson | June 17, 1947 |
| 2,439,877 | Stuart | Apr. 20, 1948 |
| 2,444,338 | Dimond | June 29, 1948 |
| 2,470,028 | Gordon | May 10, 1949 |
| 2,550,816 | Jackson | May 1, 1951 |